United States Patent
Tsuzuki et al.

(10) Patent No.: US 10,605,701 B2
(45) Date of Patent: Mar. 31, 2020

(54) ANALYSIS SYSTEM

(71) Applicant: JTEKT CORPORATION, Osaka-shi (JP)

(72) Inventors: Toshiyuki Tsuzuki, Anjo (JP); Sakon Murayama, Kariya (JP); Yuki Ishigure, Gifu (JP)

(73) Assignee: JTEKT CORPORATION, Osaka-shi (JP)

( * ) Notice: Subject to any disclaimer, the term of this patent is extended or adjusted under 35 U.S.C. 154(b) by 224 days.

(21) Appl. No.: 15/669,298

(22) Filed: Aug. 4, 2017

(65) Prior Publication Data

US 2018/0045613 A1    Feb. 15, 2018

(30) Foreign Application Priority Data

Aug. 10, 2016  (JP) ................... 2016-157613

(51) Int. Cl.
| | | |
|---|---|---|
| *G01M 99/00* | (2011.01) | |
| *G05B 19/406* | (2006.01) | |
| *G01H 13/00* | (2006.01) | |
| *G05B 19/414* | (2006.01) | |

(52) U.S. Cl.
CPC .......... *G01M 99/008* (2013.01); *G01H 13/00* (2013.01); *G05B 19/406* (2013.01); *G05B 19/4145* (2013.01); *G05B 2219/34273* (2013.01); *G05B 2219/37434* (2013.01); *G05B 2219/37435* (2013.01)

(58) Field of Classification Search
CPC .................................................. G01M 99/008
See application file for complete search history.

(56) References Cited

U.S. PATENT DOCUMENTS

| | | | | |
|---|---|---|---|---|
| 7,472,000 B2* | 12/2008 | Steiger | ..................... | G01D 3/08 |
| | | | | 180/268 |
| 7,640,139 B2* | 12/2009 | Sahara | .................. | G01H 1/003 |
| | | | | 702/182 |
| 7,882,394 B2* | 2/2011 | Hosek | ................ | G05B 23/0235 |
| | | | | 702/184 |
| 9,244,791 B2* | 1/2016 | Hamilton | ................ | G06F 11/24 |
| 9,395,383 B2* | 7/2016 | Championnet | ........... | G01P 3/44 |
| 10,120,374 B2* | 11/2018 | Hosek | ................. | G06F 11/2257 |
| 10,335,060 B1* | 7/2019 | Kahn | .................... | A61B 5/1118 |
| 2003/0163286 A1* | 8/2003 | Yasugi | ............... | G05B 19/4065 |
| | | | | 702/185 |

(Continued)

FOREIGN PATENT DOCUMENTS

| | | |
|---|---|---|
| JP | 2013-129027 | 7/2013 |
| JP | 2014-154094 | 8/2014 |
| WO | WO2012/098805 | 7/2012 |

*Primary Examiner* — Manuel L Barbee
*Assistant Examiner* — Raymond L Nimox
(74) *Attorney, Agent, or Firm* — Oblon, McClelland, Maier & Neustadt, L.L.P.

(57) ABSTRACT

An analysis system includes detectors provided in an apparatus, first analysis devices each configured to generate processed data by performing predetermined processing on detection information from each of the detectors, and to evaluate an object to be evaluated based on the detection information from each of the detectors and on an evaluation pattern, and a second analysis device configured to update the evaluation pattern based on the processed data generated by each of the first analysis devices.

20 Claims, 10 Drawing Sheets

11, 12, 13: production apparatus
21, 22, 23: first analysis device
50: second analysis device

(56) References Cited

U.S. PATENT DOCUMENTS

| | | | |
|---|---|---|---|
| 2012/0078670 A1* | 3/2012 | Yamamura | G05B 19/4184 |
| | | | 705/7.11 |
| 2012/0084030 A1* | 4/2012 | Kitagawa | G05B 15/02 |
| | | | 702/61 |
| 2013/0191049 A1* | 7/2013 | Sales Casals | G01R 31/12 |
| | | | 702/58 |
| 2014/0033830 A1 | 2/2014 | Kasuga et al. | |
| 2014/0123740 A1* | 5/2014 | Yoshikawa | B23Q 17/0961 |
| | | | 73/104 |
| 2016/0033955 A1* | 2/2016 | Satake | G05B 19/406 |
| | | | 700/174 |
| 2016/0261481 A1* | 9/2016 | Ogata | G05B 23/0264 |

* cited by examiner 11, 12, 13: production apparatus
21, 22, 23: first analysis device
50: second analysis device

ANALYSIS SYSTEM

INCORPORATION BY REFERENCE

The disclosure of Japanese Patent Application No. 2016-157613 filed on Aug. 10, 2016 including the specification, drawings and abstract, is incorporated herein by reference in its entirety.

BACKGROUND OF THE INVENTION

1. Field of the Invention

The present invention relates to an analysis system.

2. Description of the Related Art

Apparatuses such as machine tools or industrial robots can be evaluated in terms of failure, life expectancy, maintenance timings, and the like by comparing an evaluation pattern (corresponding to a determination threshold or the like) for evaluation in terms of failure, life expectancy, maintenance timings, and the like with detection information from a detector provided in each of the apparatuses.

Japanese Patent Application Publication No. 2013-129027 (JP 2013-129027 A) describes a method for monitoring a grinding burn of a workpiece. During grinding of a workpiece, a grinding load of a grinding wheel and a rotational speed of the workpiece are detected, and the detected grinding load is compared with a threshold of the grinding load based on the rotational speed, thereby determining whether a grinding burn occurs. The threshold is set based on a grinding load of the grinding wheel relative to a rotational speed of the workpiece when the grinding burn of the workpiece occurs.

International Publication No. 2012/098805 (WO 2012/098805) describes that trial grinding is performed and a threshold is set based on a grinding load of the trial grinding. Then, a grinding load detected during actual grinding is compared with the threshold, thereby determining whether a grinding abnormality occurs.

Japanese Patent Application Publication No. 2014-154094 (JP 2014-154094 A) describes that abnormalities of the quality of products are predicted based on the following quality tendency pattern. For example, in a case of grinding the outer peripheral surfaces of workpieces with a grinding wheel, the dimensional accuracy tends to deteriorate as the number of workpieces increases (see FIG. 4 of JP 2014-154094 A). Based on a relationship between a grinding time and a grinding resistance of one workpiece, a relationship between the number of workpieces and an average of grinding resistances is obtained (see FIG. 5 and FIG. 10 of JP 2014-154094 A). Considering the relationship between the number of workpieces and the dimensional accuracy, a threshold can be set for the average of grinding resistances in a quality tendency pattern indicating the relationship between the number of workpieces and the average of grinding resistances. That is, by grasping the grinding resistances and the number of workpieces, abnormalities of products can be predicted based on the quality tendency pattern and the threshold described above.

The evaluation pattern (corresponding to the determination threshold or the like) for evaluation in terms of failure and the like can be set with high accuracy by acquiring a large amount of detection information in advance. However, simple evaluation may sometimes be desired instead of high-accuracy evaluation before a large amount of detection information is acquired. Further, there is a demand that the evaluation pattern for evaluation in terms of failure and the like be updated appropriately in accordance with current situations. Therefore, the evaluation pattern is required to be updated in parallel to the evaluation of apparatuses in terms of failure and the like.

In order that a single analysis device may update the evaluation pattern while evaluating apparatuses in terms of failure and the like, the single analysis device needs to have high performance. Without the high-performance analysis device, the evaluation cannot be processed at high speed, which is unsatisfactory for achieving real-time evaluation.

SUMMARY OF THE INVENTION

It is one object of the present invention to provide an analysis system capable of suitably updating an evaluation pattern while evaluating apparatuses without using a high-performance analysis device.

An analysis system according to one aspect of the present invention includes a detector provided in an apparatus, a first analysis device configured to generate processed data by performing predetermined processing on detection information from the detector, and to evaluate an object to be evaluated based on the detection information from the detector and on an evaluation pattern, and a second analysis device configured to update the evaluation pattern based on the processed data generated by the first analysis device.

The first analysis device evaluates the object to be evaluated, and the second analysis device updates the evaluation pattern. The second analysis device uses the processed data obtained by performing the predetermined processing on the detection information from the detector. That is, the second analysis device does not update the evaluation pattern based on all the detection information from the detector. Thus, when updating the evaluation pattern, the second analysis device can process the update at a higher speed than that in a case of using all the detection information. As described above, the analysis system can reliably update the evaluation pattern while evaluating the object to be evaluated.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
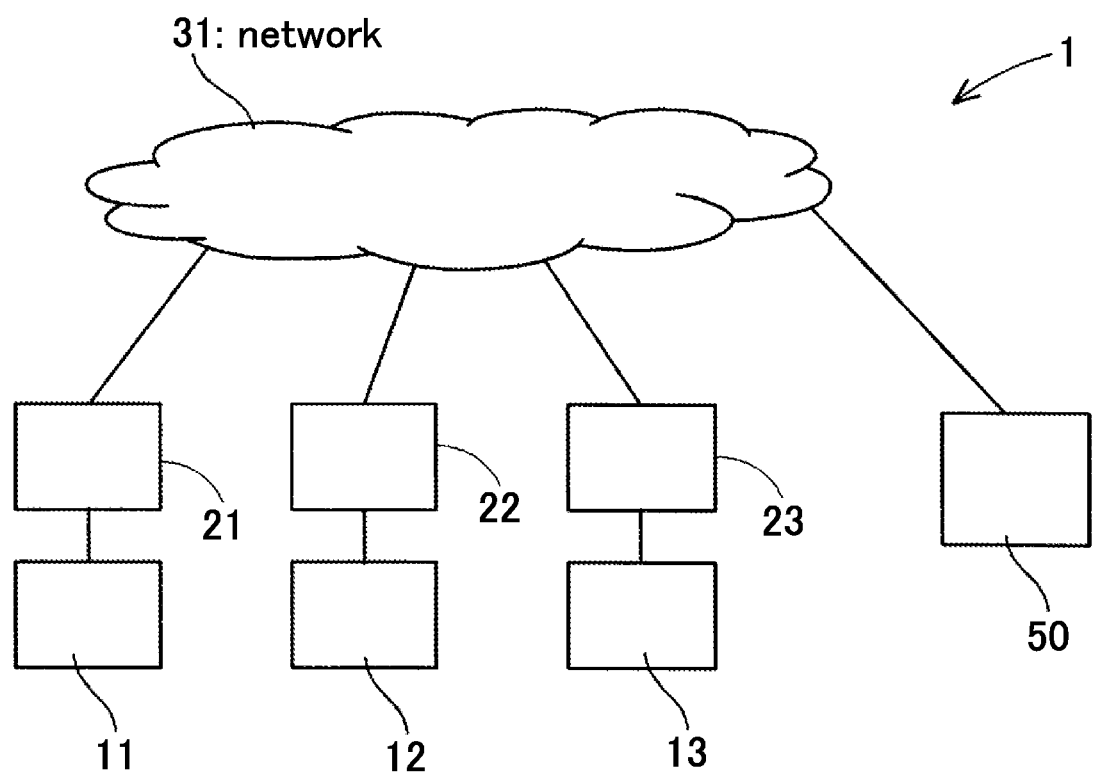
FIG. 1 is a diagram illustrating an analysis system.

The configuration of an analysis system 1 of a first embodiment is described with reference to FIG. 1. As illustrated in FIG. 1, the analysis system 1 includes production apparatuses 11 to 13, first analysis devices 21 to 23, a network 31 connected to the first analysis devices 21 to 23, and a second analysis device 50. Each of the first analysis devices 21 to 23 and the second analysis device 50 may be an embedded system such as a programmable logic controller (PLC) or a computerized numerical control (CNC) device, or may also be a personal computer, a server, or the like.

The production apparatuses 11 to 13 are apparatuses configured to produce predetermined objects to be produced. The production apparatuses 11 to 13 include a machine tool, a conveyance device, an industrial robot, or other various apparatuses. The production apparatus 11 is, for example, a machine tool assigned to a first processing step of a production line, as typified by a grinding machine configured to grind crankshafts. The production apparatus 13 is a machine tool assigned to a second processing step, as typified by a grinding machine configured to grind crankshafts similarly to the production apparatus 11. The production apparatus 12 is, for example, a conveyor configured to convey objects to be produced between the production apparatuses 11 and 13.

The production apparatuses 11 to 13 are installed in the same facility or neighboring facilities. That is, the production apparatuses 11 to 13 are installed in a predetermined area where fog computing described later can be constructed. Fog computing refers to a system that establishes network connection in a narrower area than that of cloud computing. That is, the network that constructs fog computing is a network installed in a predetermined area narrower than the area where cloud computing is constructed. Fog computing may be referred to also as edge computing.

The first analysis devices 21 to 23 are connected to the respective production apparatuses 11 to 13 to evaluate the corresponding production apparatuses 11 to 13. The first analysis devices 21 to 23 perform evaluation (determination) in terms of failure, life expectancy, maintenance timings, and the like of components of the production apparatuses 11 to 13. The first analysis devices 21 to 23 store evaluation parameters, and perform the evaluation based on detection information acquired from the corresponding production apparatuses 11 to 13 and on the evaluation parameters.

The network 31 is a network connected to the first analysis devices 21 to 23 and installed in a predetermined area where fog computing is constructed. The network 31 is installed in the same facility as the facility where the production apparatuses 11 to 13 are installed. Alternatively, the network 31 is installed in a facility neighboring the facility where any one of the production apparatuses 11 to 13 is installed. As the network 31, the Internet, a local area network (LAN), a wide area network (WAN), or the like is applicable.

The second analysis device 50 is directly connected to the network 31, and is installed in the same facility as or a facility neighboring the facility where the production apparatuses 11 to 13 are installed. The second analysis device 50 may be installed away from the facility where the production apparatuses 11 to 13 are installed. The second analysis device 50 generates and updates the evaluation parameters to be used by the first analysis devices 21 to 23 based on the detection information acquired from the production apparatuses 11 to 13.

Figure 2:
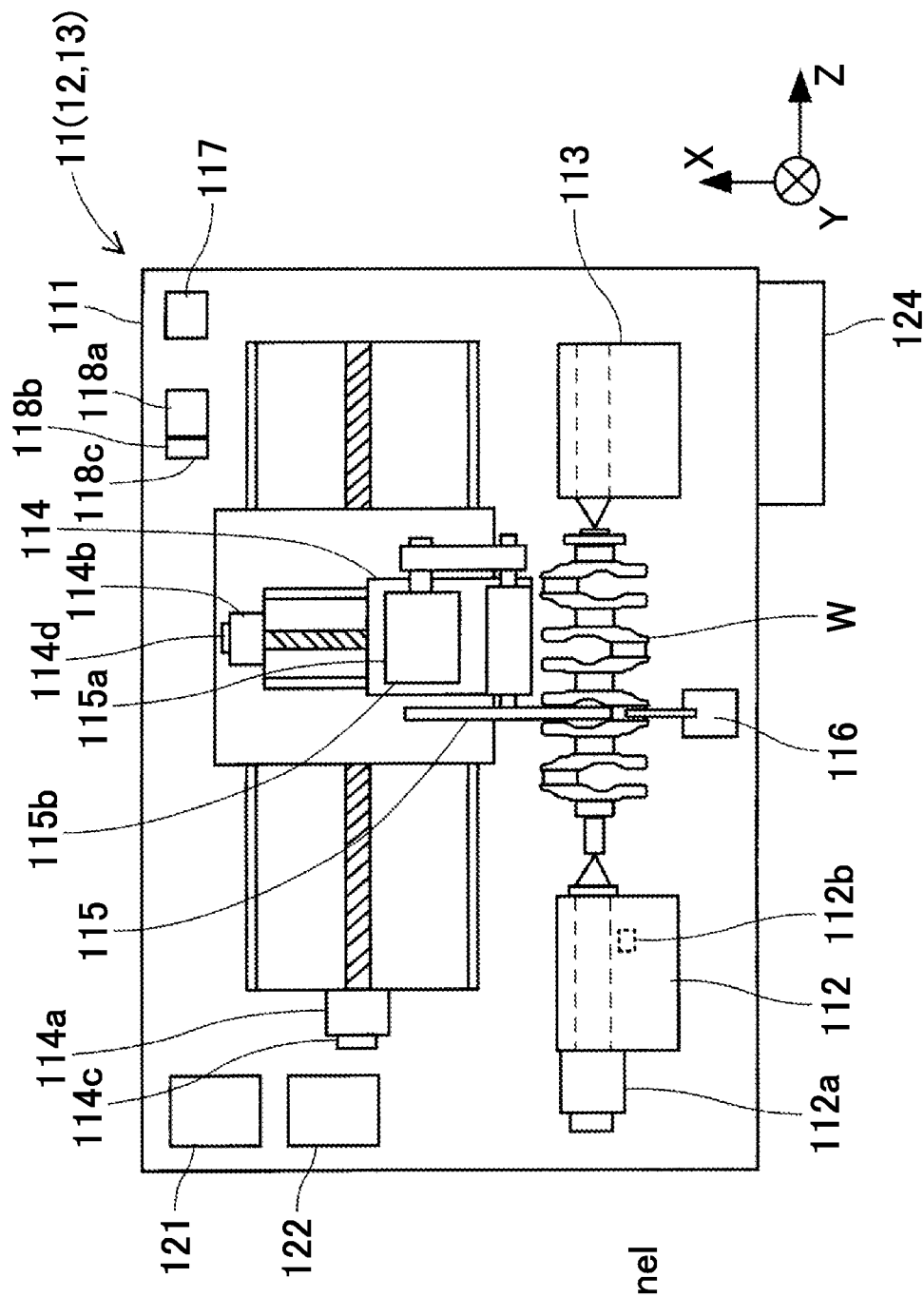
FIG. 2 is a diagram illustrating the configuration of a grinding machine that is an example of production apparatuses of FIG. 1.
Figure 3:
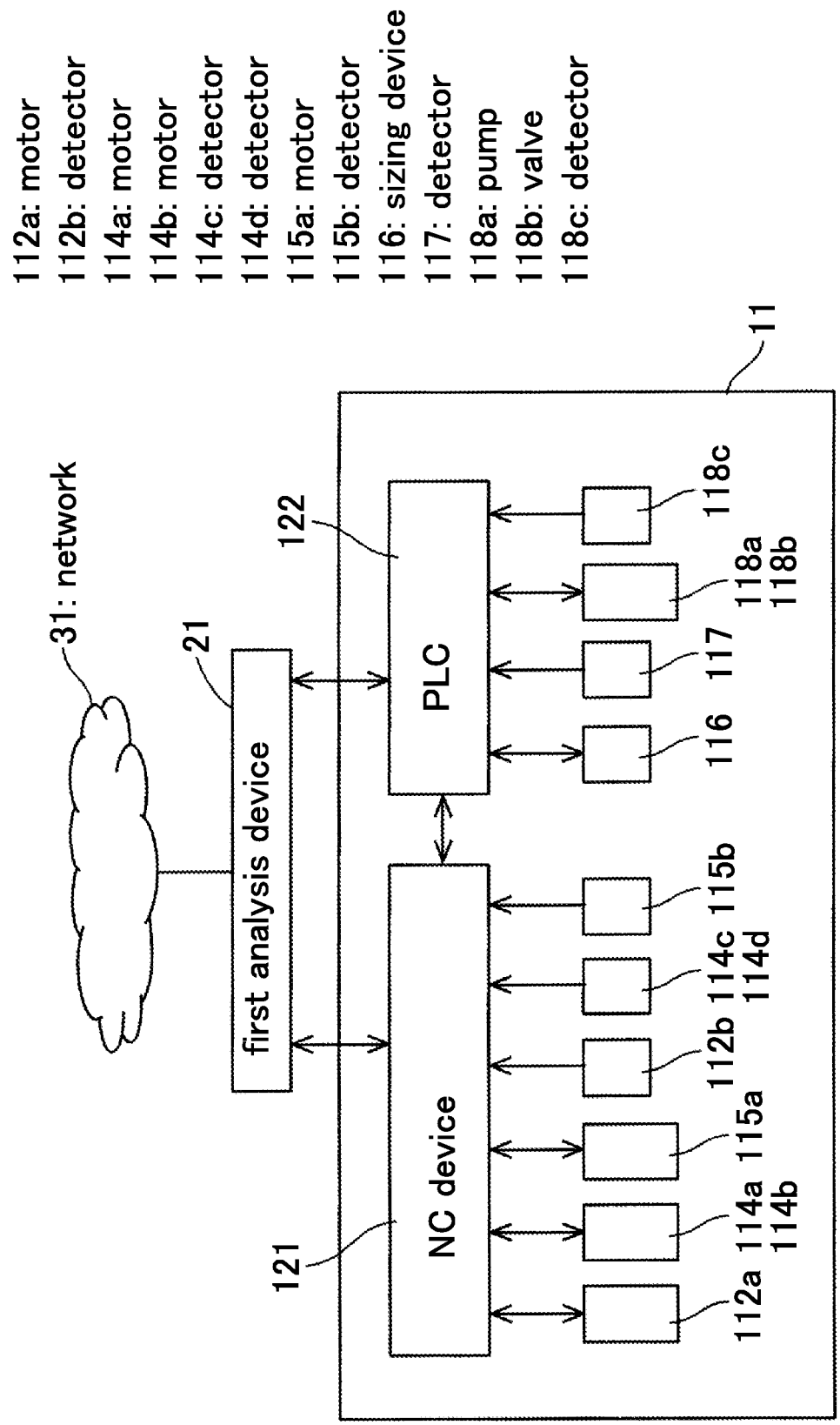
FIG. 3 is a block diagram of the production apparatus.

Next, an example of the configuration of the production apparatus 11 is described with reference to FIG. 2 and FIG. 3. In this embodiment, the production apparatus 11 is, for example, a grinding machine. Description is given taking a wheel spindle stock traverse type grinding machine as an example of the grinding machine 11. The wheel spindle stock traverse type grinding machine causes a wheel spindle stock 114 to traverse (move in a Z-axis direction) relative to a bed 111. Alternatively, a table traverse type grinding machine is also applicable to the grinding machine 11. The table traverse type grinding machine causes a headstock device 112 to traverse (move in the Z-axis direction) relative to the bed 111. The object (workpiece) to be produced by the grinding machine 11 is, for example, a crankshaft W. The grinding machine 11 grinds crank journals, crank pins, or the like of the crankshaft.

The grinding machine 11 is constructed as follows. The bed 111 is fixed to an installation surface, and the headstock device 112 and a tailstock device 113 are mounted on the bed 111. The headstock device 112 and the tailstock device 113 rotatably support both ends of the crankshaft W. The crankshaft W is supported by the headstock device 112 and the tailstock device 113 so as to rotate about the crank journals. The headstock device 112 includes a motor 112a configured to drive the crankshaft W to rotate. A detector (vibration sensor) 112b is attached to the headstock device 112. The detector 112b detects vibration of a main spindle.

The wheel spindle stock 114 is provided on the bed 111. The wheel spindle stock 114 is movable in the Z-axis direction (direction of an axis of the crankshaft W) and in an X-axis direction (direction orthogonal to the axis of the crankshaft W). The wheel spindle stock 114 moves in the Z-axis direction by a motor 114a and in the X-axis direction by a motor 114b. The wheel spindle stock 114 is provided with a detector 114c configured to detect the position of the wheel spindle stock 114 in the Z-axis direction, and a detector 114d configured to detect the position of the wheel spindle stock 114 in the X-axis direction. Each of the detectors 114c and 114d is, for example, a rotary encoder configured to measure rotation of the motor 114b or the like, and may also be a linear position detector such as a linear scale.

The wheel spindle stock 114 is provided with a grinding wheel 115 in a rotatable manner. The grinding wheel 115 grinds the crank pins or the crank journals. The grinding wheel 115 is driven to rotate by a motor 115a. Further, the wheel spindle stock 114 is provided with a detector 115b configured to detect power of the motor 115a or the like. The detector 115b is, for example, an ammeter, and may also be a wattmeter or a voltmeter configured to measure electric power or voltage of the motor 115a. The electric current, power, voltage, or the like of the motor 115a for the grinding wheel 115 can be used to indirectly obtain a grinding resistance. Alternatively, the detector 115b may be a load detector provided on the headstock device 112 or the wheel spindle stock 114 to directly obtain the grinding resistance.

The bed 111 is provided with a sizing device 116 configured to measure the outside diameter of the crank pin or the crank journal that is a portion to be ground in the crankshaft W. Further, the bed 111 is provided with a detector 117 configured to detect an environmental temperature (ambient temperature). Still further, the bed 111 is provided with a pump 118a configured to supply a coolant to the portion to be ground, a valve 118b configured to switch ON/OFF of coolant supply, and a detector 118c configured to detect the condition of the valve 118b. The detector 118c is a flow meter for the coolant, and may also be, for example, a pressure sensor configured to detect the pressure of the coolant.

The grinding machine 11 includes an NC device 121, a PLC 122, and an operator's panel 124. As illustrated in FIG. 3, the NC device 121 controls the motors 112a and 115a that cause the headstock device 112 and the grinding wheel 115 to rotate, and also controls the motors 114a and 114b that cause the grinding wheel 115 to move relative to the crankshaft W. At the time of control, the NC device 121 acquires detection information from each of the detectors 114c and 114d for the positions of the wheel spindle stock 114 and the detector 115b for the power of the motor 115a.

The PLC 122 acquires detection information from the sizing device 116. The PLC 122 controls the pump 118a and the valve 118b to control the coolant supply. At the time of control, the PLC 122 acquires detection information from the detector 118c configured to detect the condition of the valve 118b. Further, the PLC 122 acquires detection information from the detector 117 configured to detect the environmental temperature.

Sampling periods of the detectors 114c, 114d, 115b, 116, 117, and 118c are not all the same but different at least in part. For example, the sampling period of the detector 115b for the power of the motor 115a is several milliseconds, the sampling period of the sizing device 116 is several milliseconds, the sampling period of the detector 118c for the valve condition is several tens of milliseconds, and the sampling period of the detector 117 for the temperature is several tens of milliseconds. The respective sampling periods are adjusted as appropriate depending on the control method.

The above description is directed to the production apparatus 11, and the same applies to the production apparatus 13 serving as a grinding machine. Although the machine configuration is different, the production apparatus 12 serving as a conveyance device is in common with the production apparatus 11 in that various detectors are provided.

Detailed processing of each of the first analysis devices 21 to 23 and the second analysis device 50 is described with reference to FIG. 4 to FIG. 9. Each of the first analysis devices 21 to 23 acquires detection information from each of the detectors 112b, 114c, 114d, 115b, 116, 117, and 118c, and performs various kinds of evaluation by using the detection information and an evaluation pattern. The second analysis device 50 acquires the detection information from each of the detectors 112b, 114c, 114d, 115b, 116, 117, and 118c, and generates and updates the evaluation pattern. To facilitate the description, the case of using the detection information from the detector 112b is taken as an example below.

Figure 4:
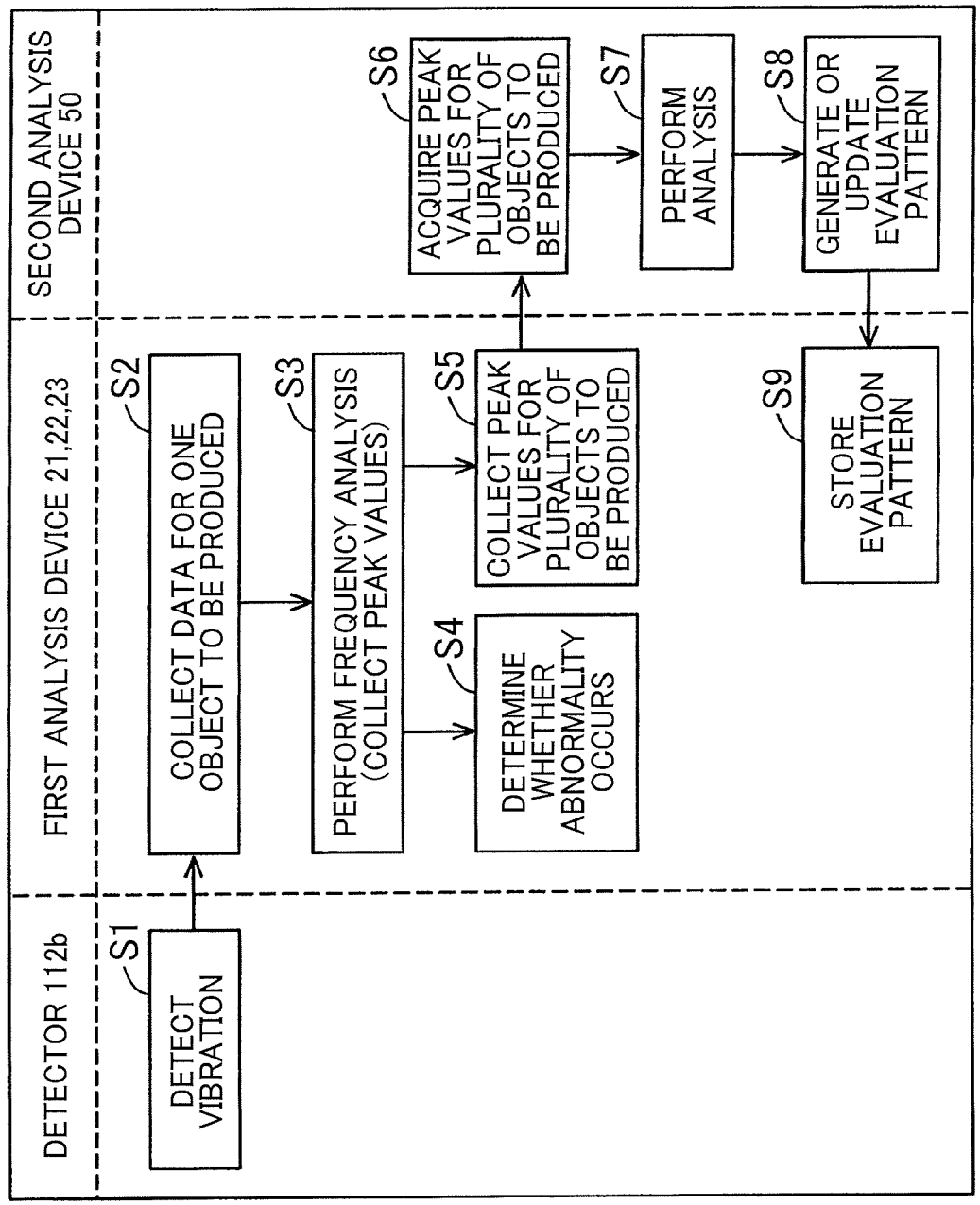
FIG. 4 is a diagram illustrating a flow of detailed processing of each first analysis device and a second analysis device according to a first embodiment.
Figure 5:
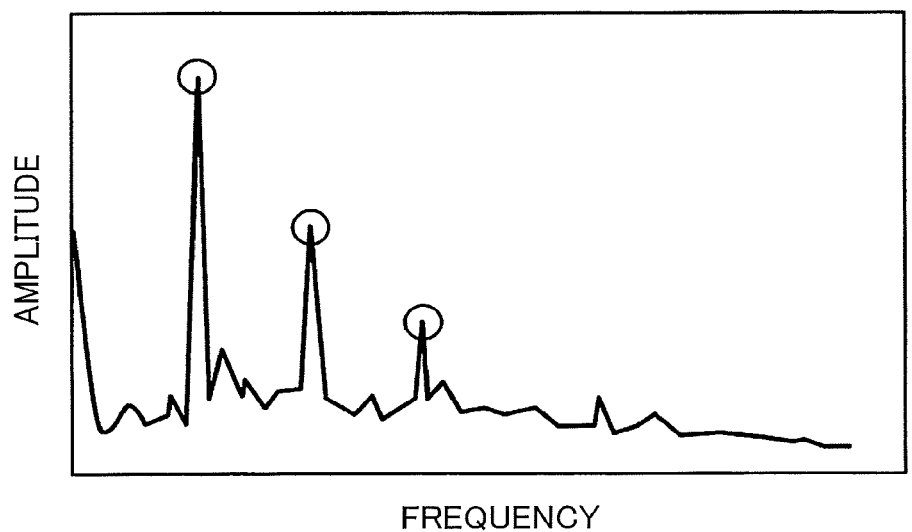
FIG. 5 is a graph illustrating a result of frequency analysis performed by the first analysis device.

As illustrated in FIG. 4, the detector 112b detects vibration of the main spindle every time the object to be produced (workpiece) is ground (S1). Then, each of the first analysis devices 21 to 23 collects data for one object to be produced (S2). Then, each of the first analysis devices 21 to 23 performs frequency analysis (corresponding to predetermined processing) on the vibration data for one object to be produced (S3). FIG. 5 illustrates a result of the frequency analysis. Then, each of the first analysis devices 21 to 23 acquires a peak value (corresponding to processed data) in a predetermined frequency band of the vibration data obtained through the frequency analysis.

As illustrated in FIG. 5, the result of the frequency analysis has peak values (circled in FIG. 5) in a plurality of frequency bands. Those frequency bands correspond to the causes of the vibration of the main spindle. The frequency bands are different depending on which part of a bearing of the headstock device 112 is damaged. For example, the frequency bands are different in cases where an outer ring is damaged, an inner ring is damaged, and rolling elements are damaged. Therefore, each of the first analysis devices 21 to 23 acquires a peak value in a frequency band corresponding to each cause of the vibration.

Figure 6:
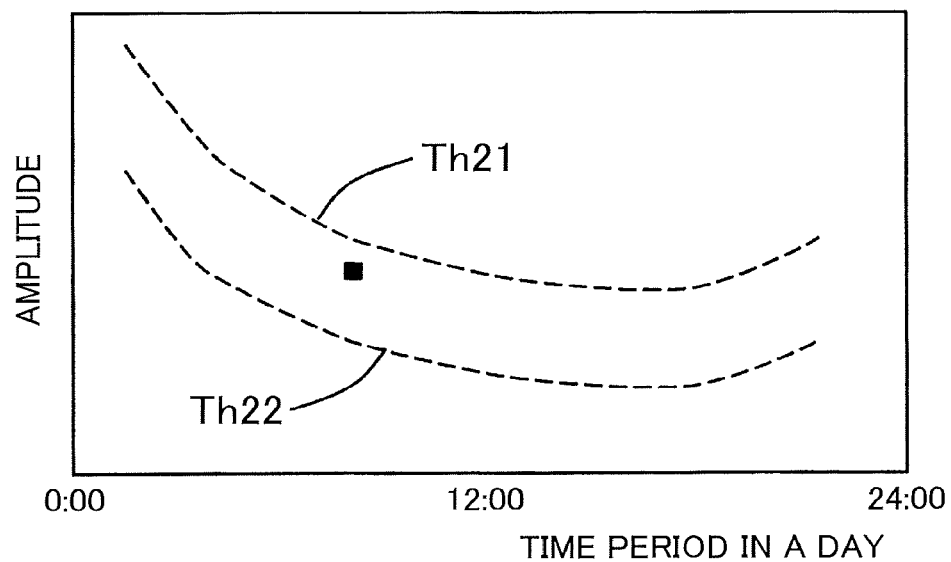
FIG. 6 is a diagram illustrating a first example of evaluation performed by the first analysis device regarding a peak value of the amplitude of vibration (evaluation parameter) on a time period in a day (reference parameter)

When thresholds Th21 and Th22 serving as the evaluation pattern have already been stored in each of the first analysis devices 21 to 23, each of the first analysis devices 21 to 23 determines whether an abnormality occurs (S4). For example, as illustrated in FIG. 6, each of the thresholds Th21 and Th22 serving as the evaluation pattern is a pattern of the peak value obtained through the frequency analysis of the vibration data (evaluation parameter) relative to a time period in a day (reference parameter). Even in a day, the magnitude of vibration varies depending on, for example, an elapsed time from activation of each of the production apparatuses 11 to 13 and the environmental temperature. Therefore, as illustrated in FIG. 6, each of the thresholds Th21 and Th22 serving as the evaluation pattern is represented by the time period in a day (reference parameter) on the horizontal axis and the peak value obtained through the frequency analysis of the vibration data (evaluation parameter) on the vertical axis.

That is, each of the first analysis devices 21 to 23 determines whether an abnormality occurs based on an actual time period that is acquired currently (reference parameter), an actual peak value that is acquired currently (evaluation parameter), and the stored evaluation pattern. In FIG. 6, the mark ■ represents the peak value relative to the actual time period that is acquired currently. The mark ■ is placed at a value equal to or smaller than the upper limit threshold Th21 and equal to or larger than the lower limit threshold Th22. Thus, each of the first analysis devices 21 to 23 determines that the condition is normal.

Figure 7:
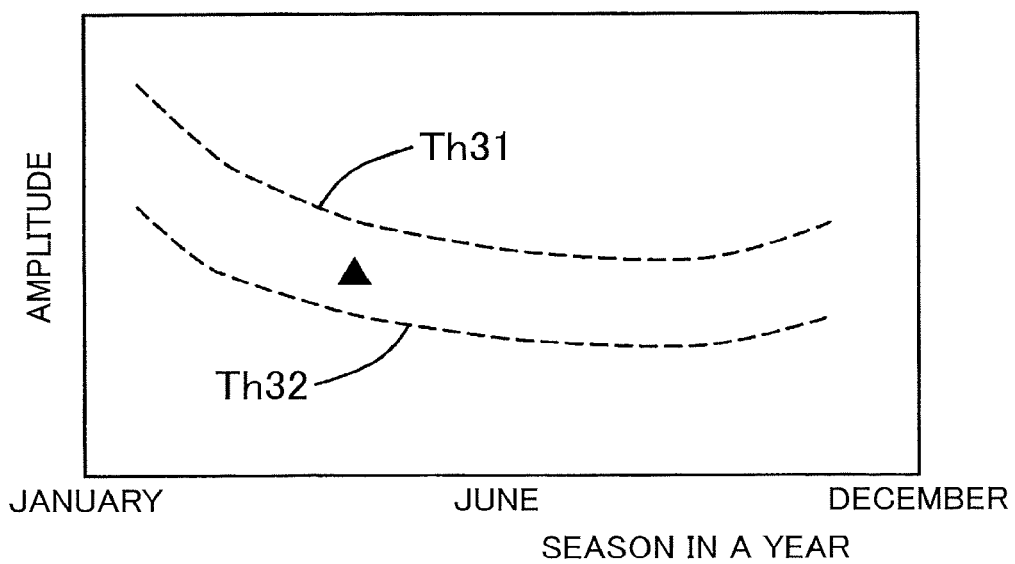
FIG. 7 is a diagram illustrating a second example of the evaluation performed by the first analysis device regarding a peak value of the amplitude of vibration (evaluation parameter) on a season in a year (reference parameter)

Each of the first analysis devices 21 to 23 also stores thresholds Th31 and Th32 serving as another evaluation pattern. For example, as illustrated in FIG. 7, each of the thresholds Th31 and Th32 serving as another evaluation pattern is a pattern of the peak value obtained through the frequency analysis of the vibration data (evaluation parameter) relative to a season in a year (reference parameter). Even in a year, the magnitude of vibration varies due to influence of a difference in the environmental temperature. Therefore, as illustrated in FIG. 7, each of the thresholds Th31 and Th32 serving as another evaluation pattern is represented by the season in a year (reference parameter) on the horizontal axis and the peak value obtained through the frequency analysis of the vibration data (evaluation parameter) on the vertical axis.

That is, each of the first analysis devices 21 to 23 determines whether an abnormality occurs based on an actual season that is acquired currently (reference parameter), an actual peak value that is acquired currently (evaluation parameter), and the stored evaluation pattern. In FIG. 7, the mark ▲ represents the peak value relative to the actual season that is acquired currently. The mark ▲ is placed at a value equal to or smaller than the upper limit threshold Th31 and equal to or larger than the lower limit threshold Th32. Thus, each of the first analysis devices 21 to 23 determines that the condition is normal.

Each of the first analysis devices 21 to 23 collects peak values (processed data) for a plurality of objects to be produced (S5). For example, each of the first analysis devices 21 to 23 collects peak values for objects to be produced in a day. The peak values for a plurality of objects to be produced, which are collected by each of the first analysis devices 21 to 23, are transmitted to the second analysis device 50 via the network 31, for example, once a day. Then, the second analysis device 50 acquires the peak values obtained through the frequency analysis of the vibration data for a plurality of objects to be produced, for example, once a day (S6). The second analysis device 50 acquires the peak values in a data amount that is far smaller than that of the detection information from the detector 112b.

Figure 8:
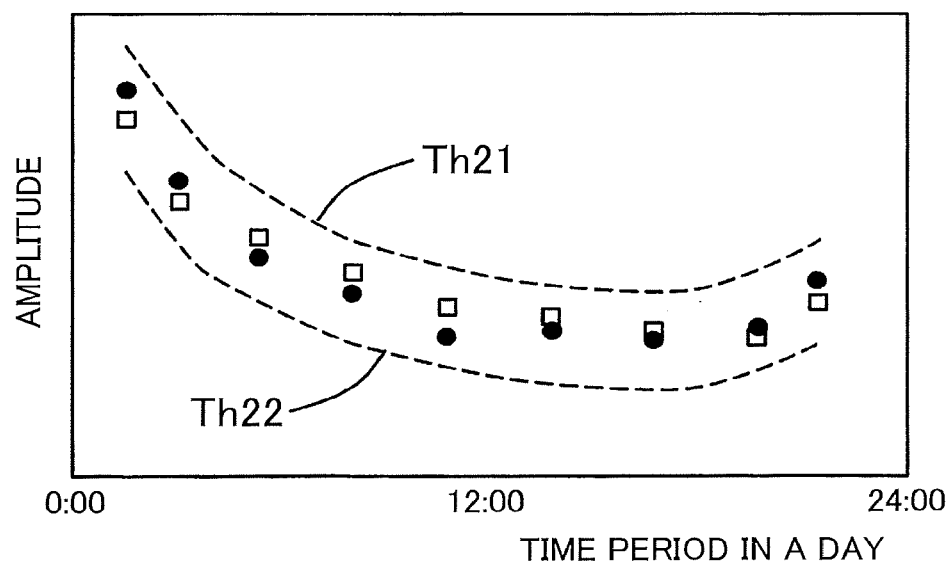
FIG. 8 is a diagram for describing how an evaluation pattern is generated by the second analysis device in the first example.

The second analysis device 50 analyzes data based on the peak values for a plurality of objects to be produced (S7). For example, FIG. 8 illustrates distribution of the peak values for two days. Then, the second analysis device 50 analyzes a normal tendency pattern based on the peak values for a plurality of days. The normal tendency pattern may be an approximation curve of the distributed data (for example, a least squares approximation curve) or a curve having a range including all the distributed data. Then, the second analysis device 50 generates the thresholds Th21 and Th22 serving as the evaluation pattern as indicated by the dashed lines in FIG. 8 based on the normal tendency pattern (S8).

When the second analysis device 50 newly acquires detection information from the detector 112b, the second analysis device 50 analyzes data again to update the thresholds Th21 and Th22 serving as the evaluation pattern (S8). Then, the second analysis device 50 transmits the thresholds Th21 and Th22 serving as the evaluation pattern to each of the first analysis devices 21 to 23 via the network 31. Then, each of the first analysis devices 21 to 23 stores the thresholds Th21 and Th22 serving as the evaluation pattern while successively updating the thresholds Th21 and Th22 (S9).

Figure 9:
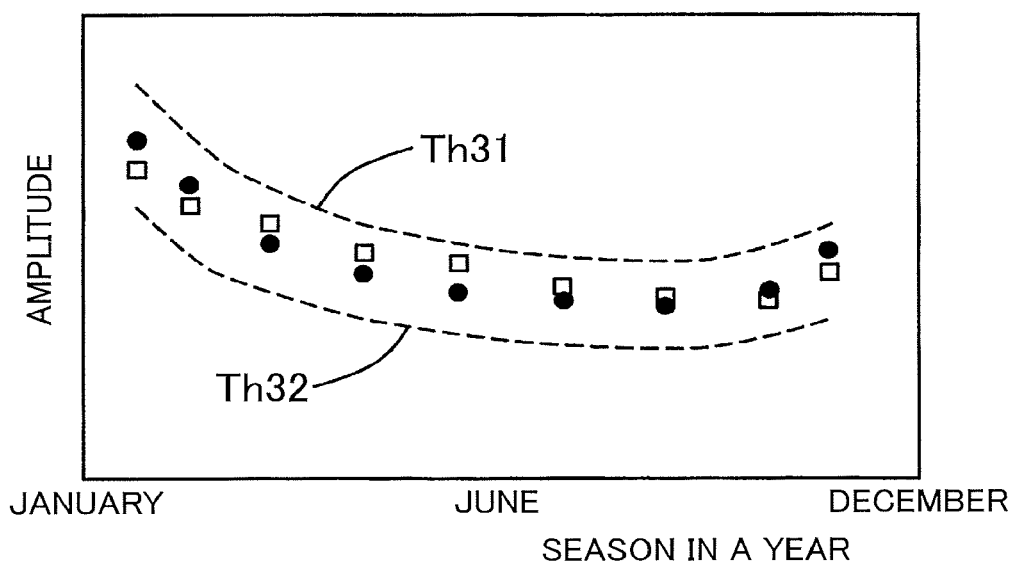
FIG. 9 is a diagram for describing how the evaluation pattern is generated by the second analysis device in the second example.

The second analysis device 50 also analyzes data based on the peak values for objects to be produced in a year (S7). For example, FIG. 9 illustrates distribution of the peak values for a year. Then, the second analysis device 50 analyzes a normal tendency pattern based on the peak values for a year. Then, the second analysis device 50 generates the thresholds Th31 and Th32 serving as the evaluation pattern as indicated by the dashed lines in FIG. 9 based on the normal tendency pattern (S8).

Similarly in this case, when the second analysis device 50 newly acquires detection information from the detector 112b, the second analysis device 50 analyzes data again to update the thresholds Th31 and Th32 serving as the evaluation pattern (S8). Then, the second analysis device 50 transmits the thresholds Th31 and Th32 serving as the evaluation pattern to each of the first analysis devices 21 to 23 via the network 31. Then, each of the first analysis devices 21 to 23 stores the thresholds Th31 and Th32 serving as the evaluation pattern while successively updating the thresholds Th31 and Th32 (S9).

The second analysis device 50 can acquire a part or all of the data collected by each of the first analysis devices 21 to 23 (can control each of the first analysis devices 21 to 23). The second analysis device 50 acquires desired data by specifying a range of data to be acquired (range to be set by values, time, or the like).

Figure 11:
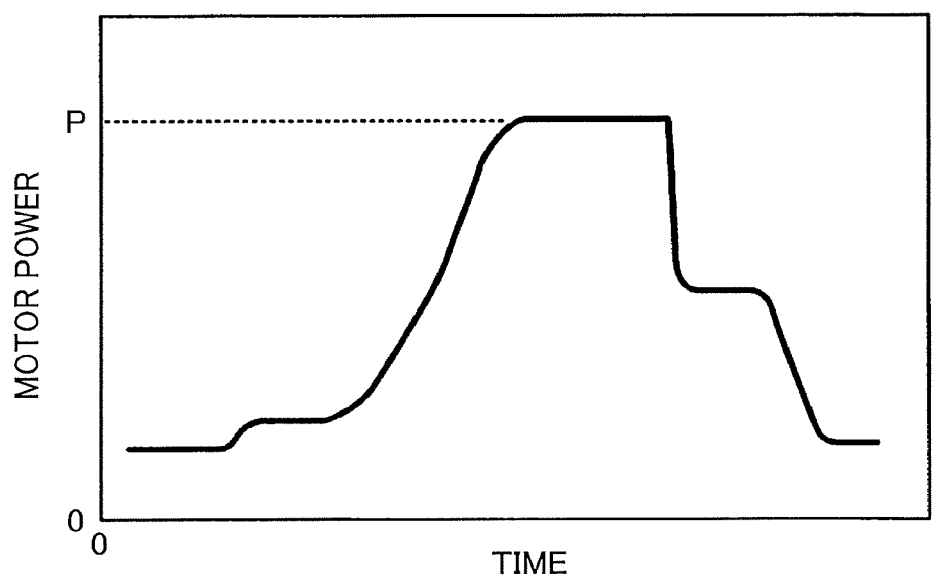
FIG. 11 is a diagram illustrating behavior of an electric current value of power of a motor for a grinding wheel relative to an elapsed time from the start of grinding of one object to be produced.
Figure 12:
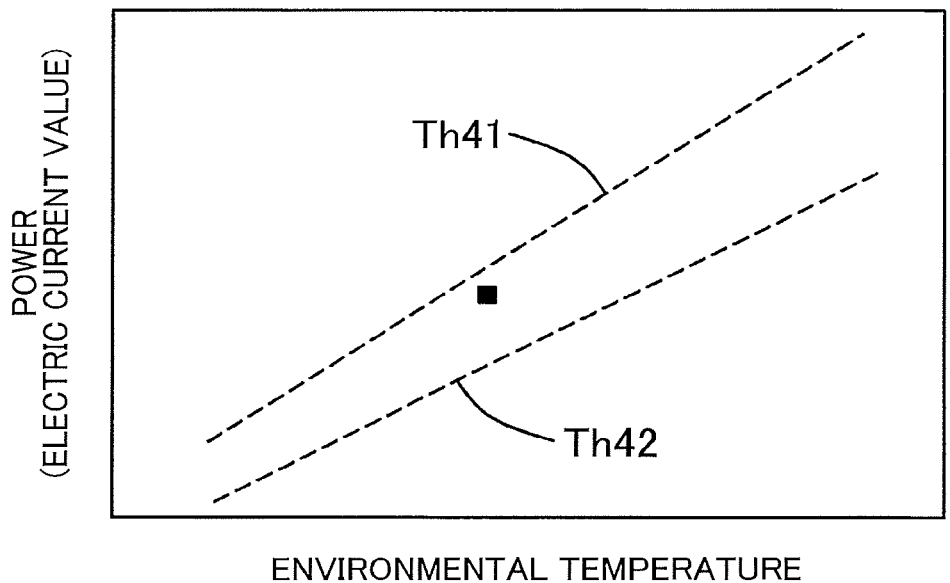
FIG. 12 is a diagram illustrating evaluation performed by the first analysis device regarding an electric current value of the power of the motor (evaluation parameter) on an environmental temperature (reference parameter)

Detailed processing of each of the first analysis devices 21 to 23 and the second analysis device 50 according to a second embodiment is described with reference to FIG. 10 to FIG. 12. The second embodiment is described taking the case of using the detection information from each of the detectors 115b and 117 as an example.

Figure 10:
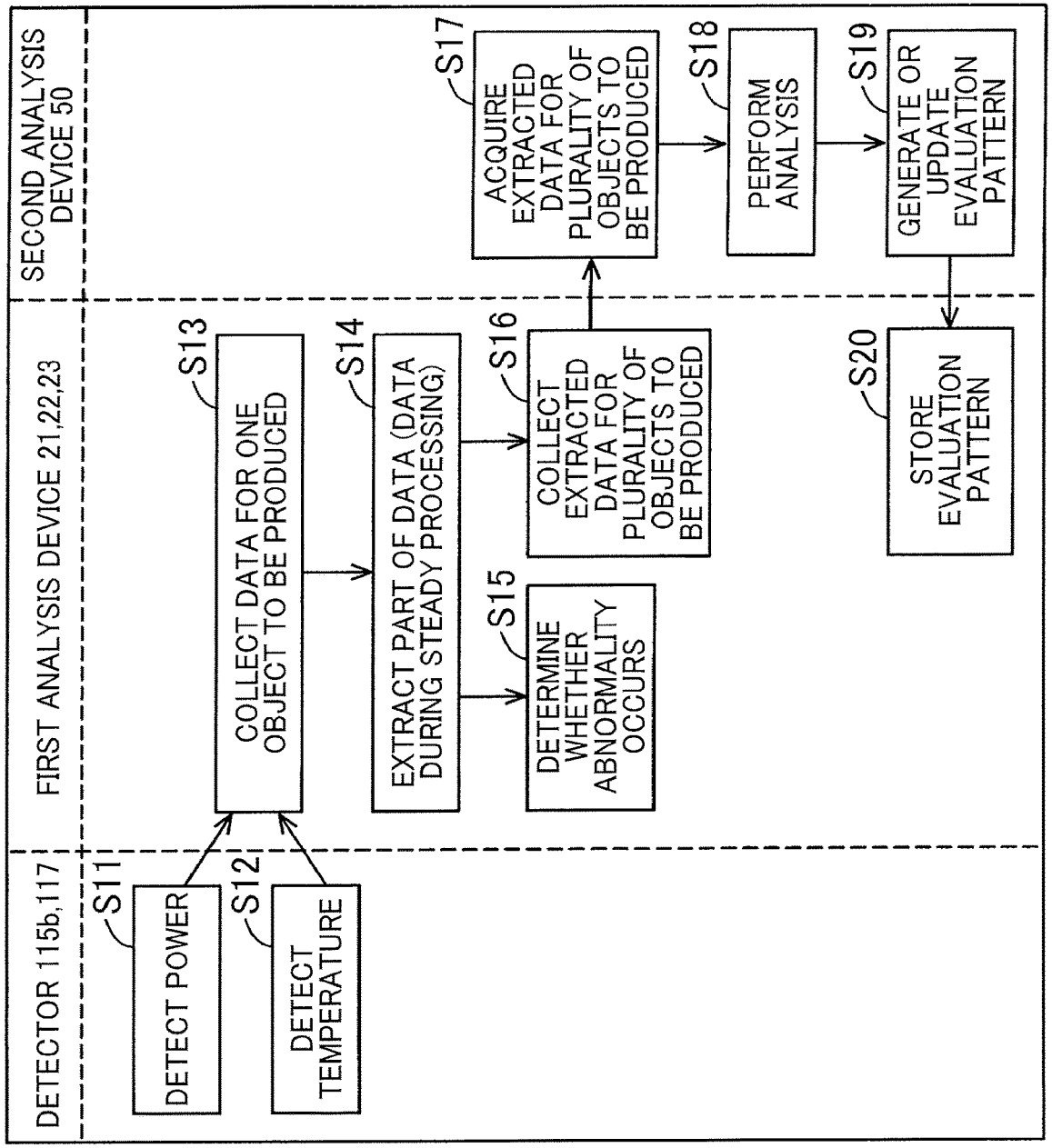
FIG. 10 is a diagram illustrating a flow of detailed processing of each first analysis device and the second analysis device according to a second embodiment.

As illustrated in FIG. 10, the detector 115b detects an electric current value of the power of the motor 115a every time the object to be produced (workpiece) is ground (S11). The detector 117 detects an environmental temperature every time the object to be produced is ground (S12). Then, each of the first analysis devices 21 to 23 collects data for one object to be produced from each of the detectors 115b and 117 (S13).

Then, each of the first analysis devices 21 to 23 extracts (corresponding to predetermined processing) data during steady processing from the data on the electric current value of the power of the motor 115a for one object to be produced (S14). FIG. 11 illustrates the detection information from the detector 115b on the electric current value of the power of the motor 115a for one object to be produced (workpiece). For example, in FIG. 11, the electric current value of the power of the motor 115a during the steady processing is represented by "P". Then, each of the first analysis devices 21 to 23 acquires the data on the electric current value P of the power, which is obtained through the extraction processing, and the data on the environmental temperature (corresponding to processed data).

When thresholds Th41 and Th42 serving as the evaluation pattern have already been stored in each of the first analysis devices 21 to 23, each of the first analysis devices 21 to 23 determines whether an abnormality occurs (S15). For example, as illustrated in FIG. 12, each of the thresholds Th41 and Th42 serving as the evaluation pattern is a pattern of the electric current value of the power of the motor 115a (evaluation parameter) relative to the environmental temperature (reference parameter). The electric current value of the power of the motor 115a changes depending on the environmental temperature. Therefore, as illustrated in FIG. 12, each of the thresholds Th41 and Th42 serving as the evaluation pattern is represented by the environmental temperature (reference parameter) on the horizontal axis and the electric current value P of the power of the motor 115a (evaluation parameter) on the vertical axis.

That is, each of the first analysis devices 21 to 23 determines whether an abnormality occurs based on an actual environmental temperature that is acquired currently (reference parameter), an actual electric current value P of the power that is acquired currently (evaluation parameter), and the stored evaluation pattern. In FIG. 12, the mark ■ represents the electric current value P of the power relative to the actual environmental temperature that is acquired currently. The mark ■ is placed at a value equal to or smaller than the upper limit threshold Th41 and equal to or larger than the lower limit threshold Th42. Thus, each of the first analysis devices 21 to 23 determines that the condition is normal.

Each of the first analysis devices 21 to 23 collects data on the electric current value P of the power and data on the environmental temperature (processed data) for a plurality of objects to be produced (S16). For example, each of the first analysis devices 21 to 23 collects data on the electric current value P of the power and data on the environmental temperature for objects to be produced in a day. The data for a plurality of objects to be produced, which is collected by each of the first analysis devices 21 to 23, is transmitted to the second analysis device 50 via the network 31, for example, once a day. Then, the second analysis device 50 acquires the data on the electric current value P of the power and the data on the environmental temperature for a plurality of objects to be produced, for example, once a day (S17). The second analysis device 50 acquires the data in a data amount that is far smaller than that of all the detection information from the detectors 115b and 117.

Figure 13:
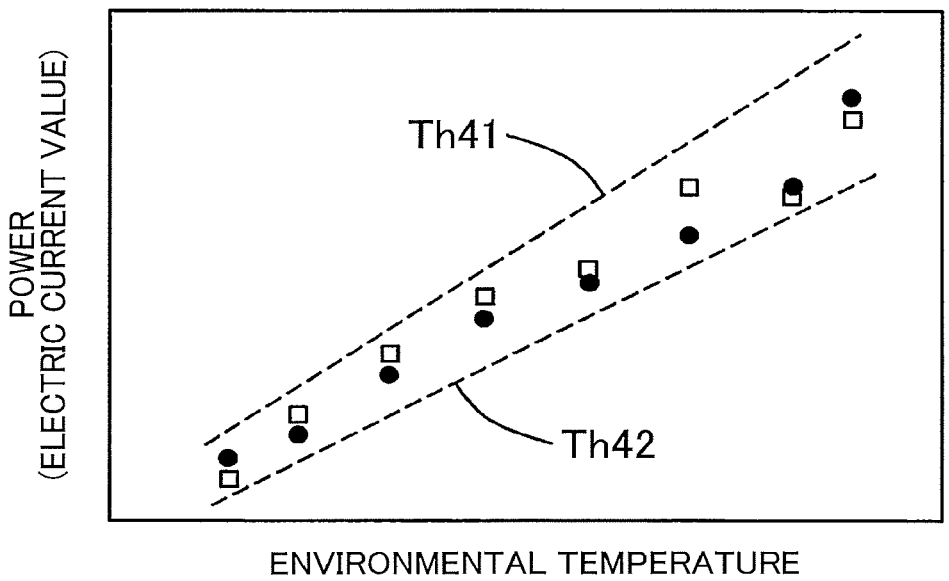
FIG. 13 is a diagram for describing how an evaluation pattern is generated by the second analysis device.

The second analysis device 50 analyzes data based on the data for a plurality of objects to be produced (S18). For example, FIG. 13 illustrates distribution of pieces of data for a plurality of days, which are different in the environmental temperature. Then, the second analysis device 50 analyzes a normal tendency pattern based on the data for a plurality of days. Then, the second analysis device 50 generates the thresholds Th41 and Th42 serving as the evaluation pattern as indicated by the dashed lines in FIG. 12 and FIG. 13 based on the normal tendency pattern (S19).

When the second analysis device 50 newly acquires detection information from each of the detectors 115b and 117, the second analysis device 50 analyzes data again to update the thresholds Th41 and Th42 serving as the evaluation pattern (S19). Then, the second analysis device 50 transmits the thresholds Th41 and Th42 serving as the evaluation pattern to each of the first analysis devices 21 to 23 via the network 31. Then, each of the first analysis devices 21 to 23 stores the thresholds Th41 and Th42 serving as the evaluation pattern while successively updating the thresholds Th41 and Th42 (S20).

In the first embodiment and the second embodiment, the analysis system 1 includes the detectors 112b, 114c, 114d, 115b, 116, 117, and 118c provided in an apparatus, the first analysis devices 21 to 23 each configured to generate processed data by performing predetermined processing on detection information from each of the detectors 112b, 114c, 114d, 115b, 116, 117, and 118c, and to evaluate an object to be evaluated based on the detection information from each of the detectors 112b, 114c, 114d, 115b, 116, 117, and 118c and on an evaluation pattern, and the second analysis device 50 configured to update the evaluation pattern based on the processed data generated by each of the first analysis devices 21 to 23.

Each of the first analysis devices 21 to 23 evaluates the object to be evaluated, and the second analysis device 50 updates the evaluation pattern. The second analysis device 50 uses the processed data obtained by performing the predetermined processing on the detection information from each of the detectors 112b, 114c, 114d, 115b, 116, 117, and 118c. That is, the second analysis device 50 does not update the evaluation pattern based on all the detection information from each of the detectors 112b, 114c, 114d, 115b, 116, 117, and 118c. Thus, when updating the evaluation pattern, the second analysis device 50 can process the update at higher speed than that in a case of using all the detection information. As described above, the analysis system 1 can reliably update the evaluation pattern while evaluating the object to be evaluated.

In particular, the data amount of the processed data obtained by performing the predetermined processing by each of the first analysis devices 21 to 23 is set smaller than that of the detection information before the processing. Therefore, the amount of communication via the network 31 can be reduced. Thus, the second analysis device 50 can reduce the length of time to acquire, for example, data for a day. As a result, the second analysis device 50 can secure a sufficient length of time for analysis.

In the first embodiment, each of the first analysis devices 21 to 23 evaluates the object to be evaluated based on the generated processed data and the evaluation pattern, and the second analysis device 50 updates the evaluation pattern based on the processed data used in the evaluation performed by each of the first analysis devices 21 to 23. That is, the processed data is shared between each of the first analysis devices 21 to 23 and the second analysis device 50.

In particular, the detector 112b is a vibration detecting sensor, and the predetermined processing performed by each of the first analysis devices 21 to 23 is frequency analysis for the detection information from the detector 112b. Therefore, each of the first analysis devices 21 to 23 does not generate dedicated data to be used by the second analysis device 50, but simply generates data to be used by each of the first analysis devices 21 to 23 themselves. Thus, each of the first analysis devices 21 to 23 does not require dedicated processing. As a result, the effect of reducing the amount of communication via the network 31 can be attained while increasing the speed of processing performed by each of the first analysis devices 21 to 23 themselves.

In the second embodiment, the predetermined processing performed by each of the first analysis devices 21 to 23 is processing of extracting specific information from the detection information from each of the detectors 115b and 117. Also in this case, each of the first analysis devices 21 to 23 does not generate dedicated data to be used by the second analysis device 50, but simply generates data to be used by each of the first analysis devices 21 to 23 themselves. Thus, each of the first analysis devices 21 to 23 does not require dedicated processing. As a result, the effect of reducing the amount of communication via the network 31 can be attained while increasing the speed of processing performed by each of the first analysis devices 21 to 23 themselves.

In the first embodiment and the second embodiment, the second analysis device 50 analyzes a normal tendency pattern on an evaluation parameter relative to a reference parameter based on the processed data, and updates the evaluation pattern on the evaluation parameter relative to the reference parameter based on the normal tendency pattern. Each of the first analysis devices 21 to 23 acquires an actual reference parameter and an actual evaluation parameter, and evaluates the object to be evaluated based on the evaluation pattern, the actual reference parameter, and the actual evaluation parameter.

As a first example in the first embodiment, the reference parameter is a time period in a day, and the evaluation parameter is a parameter that changes depending on the time period in a day. As a second example in the first embodiment, the reference parameter is a season in a year, and the evaluation parameter is a parameter that changes depending on the season in a year.

The conditions of the components of each of the production apparatuses 11 to 13 or the conditions of the objects to be produced change depending on, for example, an elapsed time from activation of each of the production apparatuses 11 to 13 and an environmental temperature. The environmental temperature changes depending on a time period in a day or a season in a year. When each of the production apparatuses 11 to 13 is activated once a day, the elapsed time from the activation of each of the production apparatuses 11 to 13 changes depending on a time period in a day. By setting the reference parameter and the evaluation parameter as described above, the conditions of each of the production apparatuses 11 to 13 or the conditions of the objects to be produced can be evaluated reliably.

In particular, the detector 112b is configured to detect vibration of each of the production apparatuses 11 to 13 or the object to be produced, and the evaluation parameter is a peak value of the vibration in a predetermined frequency band. The amplitude of vibration is a parameter that changes depending on, for example, the elapsed time from activation of each of the production apparatuses 11 to 13 and the environmental temperature. That is, the peak value is a parameter that changes depending on, for example, the elapsed time from activation of each of the production apparatuses 11 to 13 and the environmental temperature. By setting the peak value as the evaluation parameter, the conditions of each of the production apparatuses 11 to 13 or the conditions of the objects to be produced can be evaluated reliably.

In the second embodiment, the reference parameter is the environmental temperature, and the evaluation parameter is a parameter that changes depending on the environmental temperature. In this case, the environmental temperature itself is set as the reference parameter, and thus the conditions of each of the production apparatuses 11 to 13 or the conditions of the objects to be produced can be evaluated by evaluating the parameter that changes depending on the environmental temperature.

In the first embodiment and the second embodiment, the second analysis device 50 collectively acquires processing results for a plurality of times that are obtained by each of the first analysis devices 21 to 23 after the predetermined processing is performed a plurality of times by each of the first analysis devices 21 to 23. That is, the second analysis device 50 does not acquire data from each of the first analysis devices 21 to 23 every time each of the first analysis devices 21 to 23 acquires the detection information from each of the detectors 112b, 114c, 114d, 115b, 116, 117, and 118c.

In the first embodiment and the second embodiment, each of the first analysis devices 21 to 23 performs the predetermined processing on the detection information, and the second analysis device 50 acquires processed data whose data amount is reduced through the predetermined processing. Thus, the amount of communication via the network 31 is sufficiently small even when the second analysis device 50 collectively acquires the results for a plurality of times.

The second analysis device 50 may include a display device (display) and an input device (keyboard or the like) so that the analysis can be performed in cooperation with an analysis operator. The second analysis device 50 can acquire a part or all of the data collected by each of the first analysis devices 21 to 23. The analysis operator can set a range (range of values or time) of the data to be acquired by each of the first analysis devices 21 to 23 and a range (range of values or time) of the data to be transmitted to the second analysis device 50 from each of the first analysis devices 21 to 23. This setting may be made on each of the first analysis devices 21 to 23 or on the second analysis device 50.

The second analysis device 50 may determine whether the resolution, the detected position, the number of detected positions, the detection time interval (sampling interval), and the like of the detector are appropriate by performing frequency analysis (FFT), data mining, or other analyses. When the resolution of the detector is insufficient, it is only necessary to replace the detector with a high-resolution detector. When the detected position is inappropriate or the number of detected positions is insufficient or excessive, it is only necessary to shift the detected position or to change the number of detectors. When the detection time interval is inappropriate, it is only necessary to adjust the detection time interval to an optimum detection time interval or to replace the detector with a detector having an appropriate sampling interval. Thus, adjustment may be made so that optimum detection information is acquired based on the analysis results obtained by the second analysis device 50.

What is claimed is:

1. An analysis system, comprising:
a detector provided in an apparatus;
a first analysis device configured to:
generate processed data by performing predetermined processing on detection information from the detector, and
evaluate an object to be evaluated based on the detection information from the detector and on an evaluation pattern; and
a second analysis device different from the first analysis device and configured to update the evaluation pattern based on the processed data generated by the first analysis device.

2. The analysis system according to claim 1, wherein
the first analysis device is configured to evaluate the object to be evaluated based on the processed data and the evaluation pattern,
the second analysis device is configured to update the evaluation pattern based on the processed data used in the evaluation performed by the first analysis device, and
the processed data is shared between the first analysis device and the second analysis device.

3. The analysis system according to claim 1, wherein
the detector is configured to detect vibration of the apparatus, and
the predetermined processing is frequency analysis for the detection information from the detector.

4. The analysis system according to claim 1, wherein the predetermined processing is processing of extracting specific information from the detection information from the detector.

5. The analysis system according to claim 1, wherein
the second analysis device is configured to:
analyze a normal tendency pattern on an evaluation parameter relative to a reference parameter based on the processed data; and
update the evaluation pattern on the evaluation parameter relative to the reference parameter based on the normal tendency pattern, and
the first analysis device is configured to:
acquire an actual reference parameter and an actual evaluation parameter; and
evaluate the object to be evaluated based on the evaluation pattern, the actual reference parameter, and the actual evaluation parameter.

6. The analysis system according to claim 5, wherein
the reference parameter is a time period in a day, and
the evaluation parameter is a parameter that changes depending on the time period in a day.

7. The analysis system according to claim 5, wherein
the reference parameter is a season in a year, and the evaluation parameter is a parameter that changes depending on the season in a year.

8. The analysis system according to claim 6, wherein
the detector is configured to detect vibration of the apparatus, and
the evaluation parameter is a peak value of the vibration in a predetermined frequency band.

9. The analysis system according to claim 5, wherein
the reference parameter is an environmental temperature, and
the evaluation parameter is a parameter that changes depending on the environmental temperature.

10. The analysis system according to claim 1, wherein the second analysis device is configured to collectively acquire processing results for a plurality of times that are obtained by the first analysis device after the predetermined processing is performed the plurality of times by the first analysis device.

11. The analysis system according to claim 1, wherein
the detector and the first analysis device are disposed in a facility, and
the second analysis device is not disposed in the facility.

12. The analysis system according to claim 1, further comprising a plurality of the detector and a corresponding plurality of the first analysis device.

13. The analysis system according to claim 12, wherein
the detectors and the first analysis devices are disposed in a facility, and
the second analysis device is not disposed in the facility.

14. The analysis system according to claim 1, wherein the second analysis device is physically separate from the first analysis device.

15. The analysis system according to claim 1, wherein the second analysis device is configured to control the first analysis device.

16. The analysis system according to claim 1, wherein the second analysis device is configured to collectively acquire the processed data generated during a period of time after elapse of the period of time.

17. The analysis system according to claim 16, wherein the period of time is one day.

18. The analysis system according to claim 1, wherein the processed data is a subset of the detection information.

19. The analysis system according to claim 1, wherein the subset of the detection information is a set of the detection information whose quantity is less than the detection information.

20. An analysis system, comprising:
a detector provided in an apparatus and configured to output detection information;
a first analysis device configured to:
receive the detection information from the detector,
collect a subset of the detection information, the subset of the detection information being a set of the detection information whose quantity is less than the detection information, and
evaluate an object to be evaluated based on the subset of the detection information; and
a second analysis device different from the first analysis device and configured to:
receive the subset of the detection information from the first analysis device,
update the evaluation pattern based on the subset of the detection information, and
send the updated evaluation pattern to the first analysis device,
wherein the first analysis device evaluates the object to be evaluated based on the updated evaluation pattern.

* * * * *